United States Patent Office 2,847,271
Patented Aug. 12, 1958

2,847,271
POLYVINYL CHLORIDE COMPOSITION AND PROCESS FOR WETSPINNING SAME

Francesco Siclari and Angelo Bellano, Cesano Maderno, Italy, assignors to Snia Viscosa Società Nazionale Industria Applicazioni Viscosa, Milan, Italy, an Italian company No Drawing. Application March 15, 1954
Serial No. 416,376

Claims priority, application Italy April 13, 1953

2 Claims. (Cl. 18—54)

This invention relates to a process for the wet-spinning of polyvinyl chloride and compositions of matter employed in said process. The compositions are solutions of polyvinyl chloride in methyl-tetrahydrofurfuryl-amine, having the formula

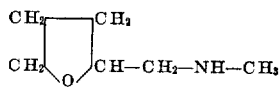

A process for preparing methyl-tetrahydrofurfurylamine will now be described. Said process essentially consists in the catalytic hydrogenation carried out in an aqueous solution or in a methyl-alcoholic solution or even in the absence of any solvent, of the base of Schiff obtained from tetrahydrofurfurylamine and formaldehyde.

Tetrahydrofurfurylamine is a known compound, the preparation of which is described in textbooks of chemistry, for instance in Organic Syntheses, No. 25, page 70.

An aqueous solution of said base of Schiff is obtained by adding commercial formaldehyde to tetrahydrofurfurylamine, diluted in the desired amount of water, and by heating the mixture to about 70° for about 3 hours.

An alcoholic solution is obtained by adding commercial paraformaldehyde to the same amine diluted with at least an equal amount of methyl alcohol, and by heating the mixture under reflux until the dissolution is complete and then for about 2 more hours.

To work without solvents, paraformaldehyde is added to the same amine previously heated to 60° approximately.

The addition is effected little by little, because the reaction is strongly hexothermic. The reaction is over when all the aldehyde has been added and has completely dissolved.

The base of Schiff obtained in any one of the aforementioned manners, must be hydrogenated. Such operation does not involve any great difficulties. In all three cases (aqueous solution, methyl-alcoholic solution, absence of solvents) it is carried out with hydrogen between 60° and 80° approximately, in the presence of Raney nickel catalyst, and at pressures between about 60 and 120 atmospheres. The hydrogen is quickly and quantitatively absorbed.

The reactions through which first the base of Schiff and then the methyl-tetrahydrofurfurylamine are obtained, are the following

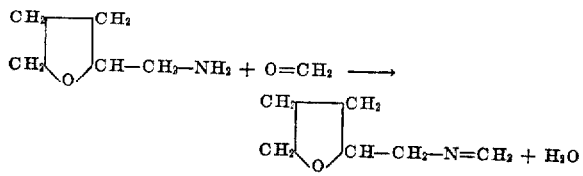

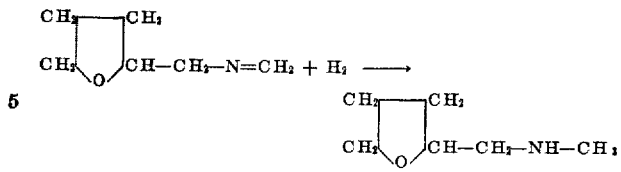

The methyl-tetrahydrofurfurylamine is separated from the reaction mass by rectification of this latter at normal pressure. The total yield amounts to 80–85% of the theoretical yield. The final product has a molecular weight of 115 and a boiling point, at atmospheric pressure, of 152–153° C.

The compound hereinbefore described is useful in the preparation of new compositions of matter, and precisely of spinnable viscous solutions of polyvinyl chloride. Said solutions are prepared by directly adding polyvinyl chloride to methyl-tetrahydrofurfurylamine.

The invention can be carried out according to the following embodiment. The polymer is added to the amine and the mixture is heated to about 45°; the dissolution is complete, after about one hour.

The solution is brought to a temperature of about 18° and is allowed to stand for about 2 hours, whereafter it may be considered as stabilized. The viscosity obviously depends upon the concentrations and the temperature. By way of example there will be listed below the viscosities determined at 18° by the use of a viscosimeter having the following characteristics: diameter of the tube 19 mm.; distance covered by the falling sphere 200 mm.; diameter of the steel sphere ⅛″. The viscosities measured refer to two solutions of polyvinyl chloride having a coefficient $K=73-75$. The coefficient K, as is known, is the coefficient defined by the equation of Fikentscher. The first solution contained 10% of polymer and the second solution 12%.

| Aging: | Viscosity of 10% solution |
|---|---|
| At discharge | 12″ |
| After 60′ | 13.3″ |
| After 120′ | 14.3″ |
| After 180′ | 16″ |
| After 300′ | 17″ |
| After 12 hours | 24″ |

| Aging: | Viscosity of 12% solution |
|---|---|
| At discharge | 37″ |
| After 60′ | 45″ |
| After 210′ | 65.6″ |
| After 6h.30′ | 89.5″ |
| After 7h.30′ | 100.5″ |

The viscous polyvinyl chloride solutions thus obtained are spun by wet spinning according to the known technique.

The coagulation baths simply consist of water or more exactly of a solution of methyl-tetrahydrofurfurylamine in water.

The temperature must be comprised between 1° and 80°: the coagulation actually occurs even in the cold. Naturally the baths tend to become richer in methyl-tetrahydrofurfurylamine; therefore their composition must be controlled so that the percentage of amine will not exceed 75%. For instance, it is possible efficiently to spin at a temperature of about 18° if the concentration of amine in the bath is kept at about 20%.

What we claim is:

1. As new compositions of matter, spinnable solutions of polyvinyl chloride consisting of said polyvinyl chloride and of methyl-tetrahydrofurfurylamine as the solvent.

2. A process for the spinning of polyvinylchloride comprising the steps of dissolving the polyvinyl chloride in methyl-tetrahydrofurfurylamine to form a viscous solution and spinning said solution into a coagulation bath essentially consisting in an aqueous solution of methyl-tetrahydrofurfurylamine having a content of methyl-tetrahydrofurfurylamine not exceeding 75%, at a temperature comprised between 1° and 80° C.

References Cited in the file of this patent

UNITED STATES PATENTS

| | | |
|---|---|---|
| 2,070,524 | Cramer | Feb. 9, 1937 |
| 2,278,202 | Lange | Mar. 31, 1942 |
| 2,338,655 | McNally et al. | Jan. 4, 1944 |
| 2,616,869 | Heisenberg et al. | Nov. 4, 1952 |
| 2,617,777 | Heisenberg et al. | Nov. 11, 1952 |